Nov. 13, 1962 W. E. MITCHELL 3,063,491
BUILDING APPARATUS FOR PNEUMATIC TYRES
Filed Oct. 14, 1957 3 Sheets-Sheet 1
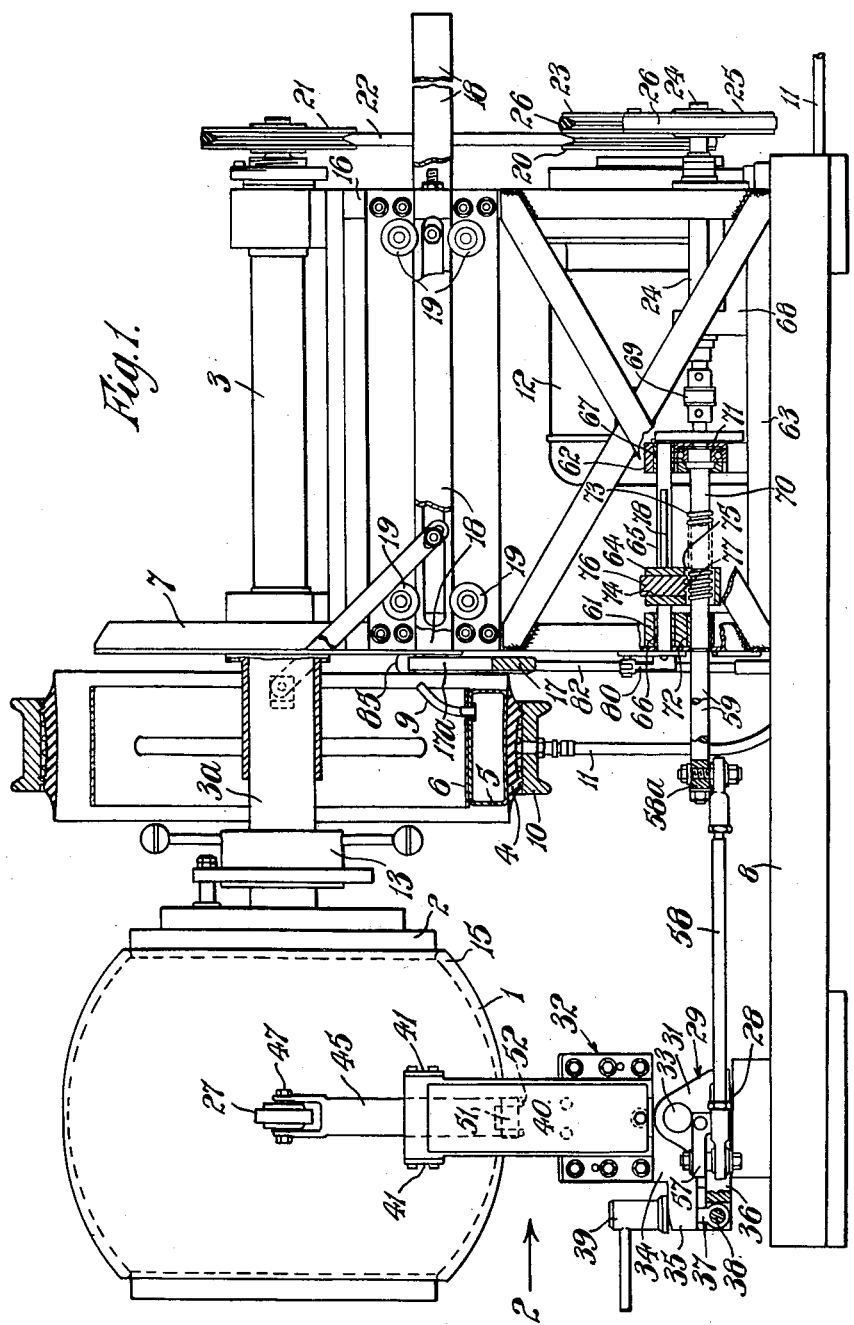

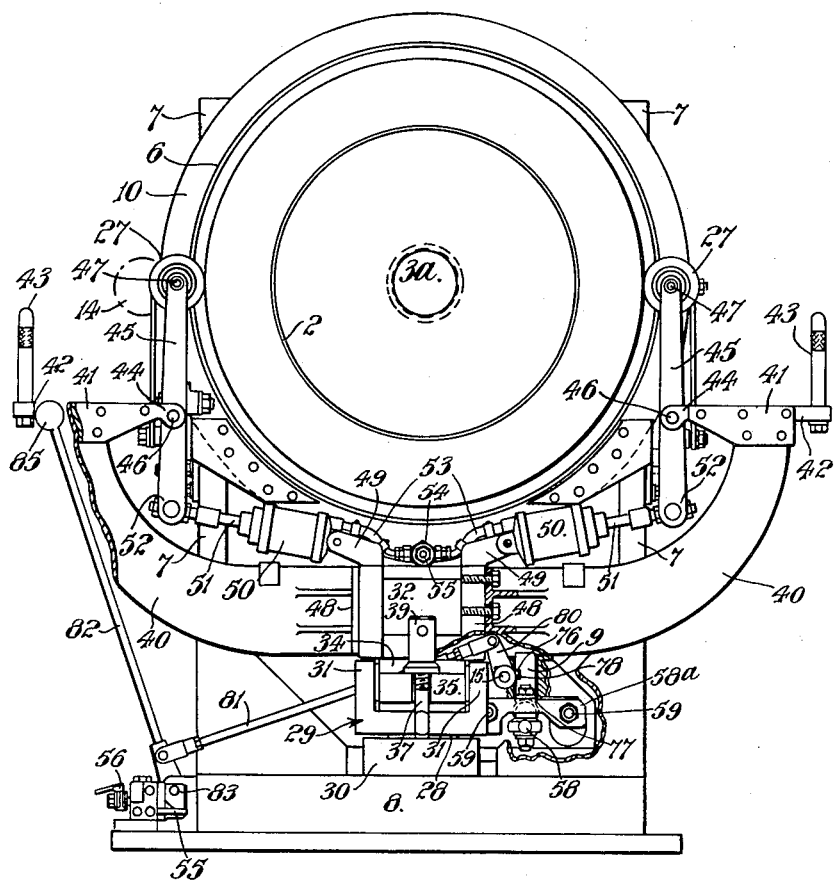

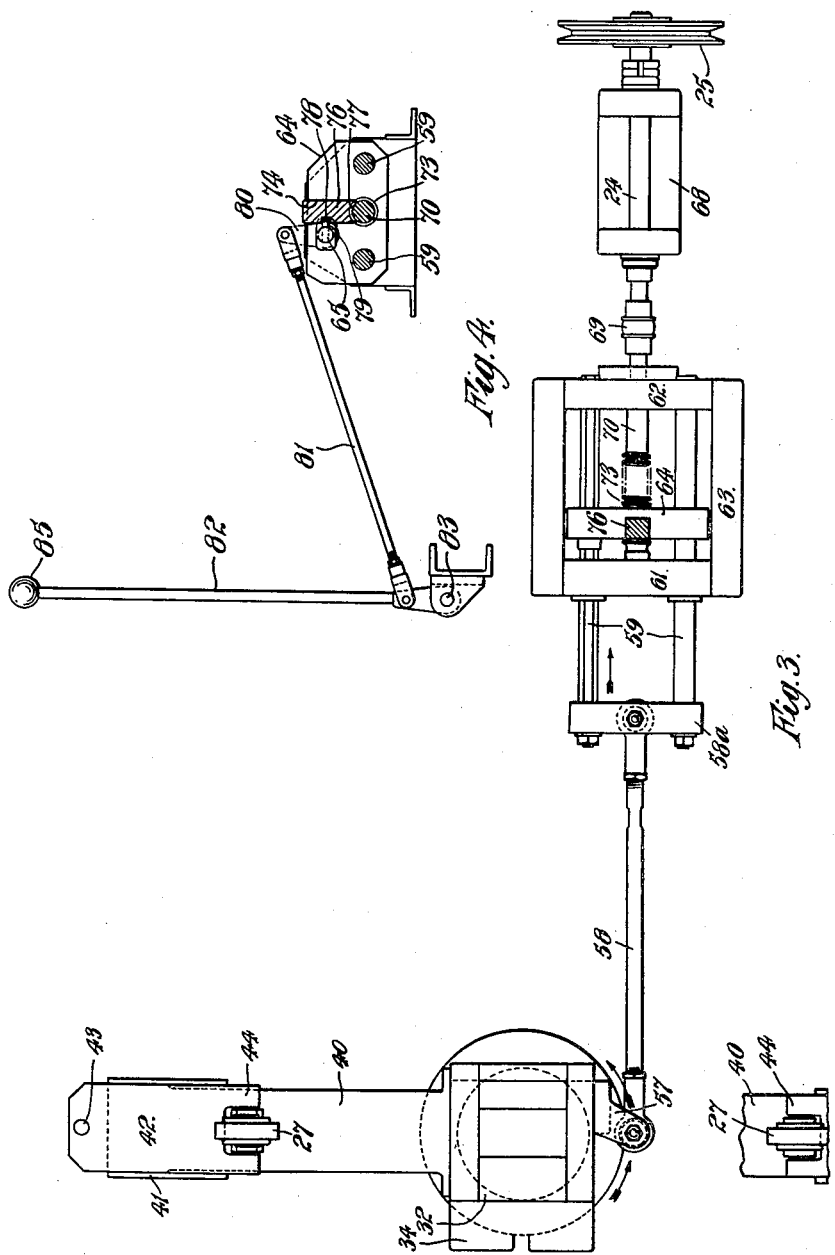

United States Patent Office 3,063,491
Patented Nov. 13, 1962

3,063,491
BUILDING APPARATUS FOR PNEUMATIC TIRES
William Eric Mitchell, Coventry, England, assignor to Dunlop Rubber Company Limited, London, England, a British company
Filed Oct. 14, 1957, Ser. No. 690,073
Claims priority, application Great Britain Oct. 16, 1956
5 Claims. (Cl. 156—410)

This invention relates to a method and apparatus for building pneumatic tires, and more particularly relates to a method and apparatus for consolidating or stitching the tread and sidewall layers of a pneumatic tire of the type, and constructed by the method and apparatus, described in Patent No. 2,906,314, September 29, 1959.

In the above specifications a pneumatic tire is described in which the reinforcement comprises a continuous length of rubberized cord which is wound in great circles around a substantially part-spherically-shaped former in such a manner that each loop or turn of cord extends obliquely around the former in a geodesic path and makes tangential contact with opposite edges of the reinforcement at positions substantially diametrically opposite one another. Side wall and tread rubber is then applied to the outside of the reinforcement, which is then removed from the former and shaped and moulded in the conventional manner.

My present invention provides a method and apparatus whereby the side wall and tread rubber may be consolidated or stitched to the cord reinforcement.

According to the present invention, a method of manufacturing tires of the kind in which the reinforcement comprises a continuous length of cord wound obliquely around a substantially part-spherical surface of a building former comprises applying tread and/or sidewall layers to said reinforcement, rotating said former about its axis of rotation and simultaneously pressing a pair of rollers located one on each side of said surface into contact with said layer or layers and traversing said rollers in an arc about the radius of said surface to consolidate or stitch said layer or layers to said reinforcement.

According to the present invention also apparatus for the manufacture of pneumatic tires comprises a former having a surface of spherical curvature to support a tire carcass, and a pair of rollers located one on each side of said former to consolidate and stitch the tread and sidewall layers to the wound reinforcement, said rollers being mounted on a frame rotatable about an axis which passes through the centre of the former, means to force the rollers inwardly against said layers and means to rotate the frame so that each roller traverses from the median plane of the tire to an edge thereof.

But a better understanding of the invention may be had from the following description when read with reference to the accompanying drawings, of which:

FIGURE 1 is a side elevation of apparatus according to the invention, said apparatus being shown in association with apparatus for applying the tire tread to the reinforcement and the drawing showing portions of the apparatus in section and other portions broken away, FIGURE 2 is a view in the direction of the arrow 2 of FIGURE 1, portions again being shown in section or broken away, and FIGURES 3 and 4 are views of portions of the actuating mechanism separated from the apparatus to give a clearer indication of these features.

As more fully described in said Patent No. 2,906,314, the cord reinforcement 1 (FIGURE 1) is laid on the part-spherical winding surface of a collapsible former 2 which has previously been covered wtih a layer of uncured rubber to form the inner lining of the tire. The cord is laid by a winding arm rotating around the former in such a manner that the cord extends obliquely around the former in a geodesic path and makes tangential contact with opposite edges of the reinforcement at positions substantially diametrically opposite one another. At the same time the former is rotated slowly so that each winding of cord around the former lies adjacent the previous winding and a latticed reinforcement is built up over the winding surface of the former.

The former 2, complete with wound reinforcement 1, is then removed from the winding apparatus, and is placed on the free end of a rotatable spindle 3 of an apparatus on which the tread 4 and sidewalls (not shown) of the tire are applied to the reinforcement 1.

The tread 4 of the tire is cut by weight from a length of extruded stock and is circled to form an endless band which is fitted over an annular air bag 5 secured to the outer periphery of a cylinder 6 which, in the present apparatus, is secured to an upright member 7 which extends vertically from the base 8 of the apparatus. The cylinder 6 is disposed co-axially of, and surrounding, the free end 3a of the rotatable spindle 3 upon which the former 2 is detachably mounted. When the tread 4 is fitted around the air bag 5, the bag is inflated by compressed air passed through a conduit 9 from a suitable source, and the tread 4 is expanded into contact with the inner periphery of a vacuum cylinder 10 from which the air is then exhausted through a flexible conduit 11 leading to a vacuum pump (not shown) of any suitable type.

Exhaustion of the air in the vacuum cylinder 10 causes the tread 4 to be held thereagainst, and the air bag 5 is then deflated.

The former 2, with a wound reinforcement 1 in position thereon, is mounted on the free end 3a of the shaft 3 and is secured to the shaft to rotate therewith on energisation of the motor 12, as by a quick-release chuck or collett device 13, and either the surface of the reinforcement 1, or the inner periphery of the tread 4 are treated with a suitable adhesive. The rolling arms, later to be described, are held clear of the surface of the former 2, as shown at 14 in FIGURE 2, and the vacuum cylinder 10, with the tread 4 held thereto, is then slid axially over the former 2 until the tread 4 lies outside, and medially of, the former and the associated reinforcement 1. The vacuum in the cylinder 10 is then released and the tread 4 contracts upon the reinforcement 1.

The reinforcement 1, with tread 4 temporarily attached, is now ready for the consolidating, or "stitching" operation, the purpose of which is to expel any air which may have been trapped between the reinforcement and the tread, and to press these components together firmly and wrinkle-free preparatory to application of the sidewall rubber.

To perform the stitching operation with a minimum of handling of the uncured tire, the former 2, airbag 5, vacuum cylinder 10 and shaft 3 are mounted in a frame which comprises vertical members 7 and 16 which extend vertically from a base frame 8 of rectangular form, the members 16 extending vertically one from each corner of the base frame 8 remote from the former 2, and the members 7 extending vertically from opposite sides of the base frame substantially mid-way of its length and to the rear of the vacuum cylinder 10, as taken from the left of FIGURE 1.

The vacuum cylinder 10 is secured, at each side of its lowermost peripheral portion, to a bracket 17 which has an arcuate upper edge 17a to provide sufficient clearance between the arcuate surface and the periphery of the former to allow the cylinder 10 to be slid over the former sufficiently to centralise the tread 5 thereon. The bracket 17 is secured to a pair of slides 18, which are slidable between flanged rollers 19 and comprise a sliding carriage for the cylinder 10.

The motor 12 is mounted on the base frame 8 and is adapted to rotate the shaft 3 through pulleys 20 and 21 and a V-belt 22. A further pulley 23 on the motor shaft is adapted to rotate a shaft 24 adjacent the base frame 8 through a pulley 25 and a V-belt 26. The purpose of the shaft 24 will be described hereunder.

Consolidating, or "stitching" of the tread 4 and side walls to the reinforcement 1 is effected by rotating the former 2 and at the same time pressing oppositely-disposed rollers 27 against the periphery of the tread or sidewalls as they rotate with the former. The rollers 27 revolve on horizontal axes and are traversable about the vertical axis of a horizontal turn table 28 so that they may be oriented to first engage the periphery of the tread or sidewalls at any desired position relative to the former and may then be traversed to sweep through arcs of any desired width between the centre of the tread 4 and the opposite beads 15. It is thus practicable to first engage the centre of the tread 4 and then gradually traverse the rollers 27 until they sweep over substantially half of the full periphery of the tire carcass.

A block 29, having the turntable 28 received in a suitable bearing in a block 30 secured to the base frame 8, has upstanding ears 31 between which a vertical frame 32 is pivoted on a horizontal pin 33. The frame 32 comprises a block 34 having a horizontal projection 35 extending horizontally towards the adjacent end of the base frame 8 and being bifurcated at its outer end. A similarly bifurcated projection 36 extends from the block 29 and between these bifurcations an eye bolt 37 is pivoted on a pin 38 in such manner that it may be passed between the bifurcations in the projection 35 and locked therein by a threaded cap-nut 39 engaging the upper surface of the projection 35 and locking the blocks 34 and 29 together to immobilise the horizontal pivot 33.

Secured on opposite sides of the frame 32 so that they normally extend transversely across, and above, the base frame 8, is a pair of substantially arcuate arms 40 which are swept radially-outwardly and upwardly in substantial arcuate form to a position substantially halfway between the shaft 3 and the lowermost portion of the former 2, and well clear of its periphery. To the upper ends of each arm 40 is secured a pair of plates 41 which enclose, and are secured to, a horizontal arm 42 which extends outwardly and inwardly of each arm 40, and each of which has a knurled handle 43 at its outer end and a bifurcated pair of ears 44 at its inner end.

A vertical lever 45 is pivoted on a pin 46 between each pair of ears 44 and in the bifurcated upper end of each lever 45 is mounted one of the rollers 27 rotatable about a pin 47.

Interposed between the frame 32 and each arm 40, and secured therebetween on each side of the frame 32, is a vertical member 48, the upper end of each of which is cranked outwardly and bifurcated to form a pair of ears 49 between each of which is pivoted the base of the cylinder 50 of a fluid-pressure operated jack or ram, the piston rod 51 of each of which is adjustably and pivotally disposed between a pair of ears 52 formed in the lower end of each lever 45.

Pressure fluid is adapted to be admitted to the cylinders 50 through conduits 53 branching from a T-union 54 to which fluid is supplied from a conduit 55 controlled by a stop valve 56, which may conveniently be located on the base frame 8 so as to be controlled by the operator's foot. This particular location is not, however, essential. The jacks or rams are preferably self-cancelling and air-operated so that the valve 56 may be closed when the appropriate pressure of the rollers 27 on the tread 4 is obtained and the apparatus continues to be operated at that pressure and, upon completion of the consolidating operation, the valve 56 is operated to exhaust the air from the cylinders 50, when suitable springs therein will automatically retract the rollers 27 from the tire to their fullest extent.

While the rollers 27 may be swept across the face of the tread 4 of the tire on the rotating former 1 merely by appropriate movement of the frame 32 about the pivotal axis of the turn table 28 by manual operation of the hand levers 43, such manual operation, in addition to being laborious when the rollers 27 are fully engaged, would be unsatisfactory inasmuch that an even and regular sweep of the rollers 27 across the tire surface would be difficult to obtain.

Accordingly means are provided whereby this traversing operation may be performed by mechanical means under the full control of the operator.

To accomplish this, an arm 57 is extended horizontally outwards from the block 29, parallel with one of the arms 40 and adjacent the base frame 8, and its free end is pivotally connected with a link rod 58 which, in turn, is pivotally connected with a cross bar 58a connected, in turn, to a parallel pair of rods 59 which are slidable in bearings in a block 61 secured to one of the vertical frame members 7 and in a similar block 62 secured to a sub-frame member 63 attached to the base frame 8. Between the blocks 61 and 62 the rods 59 are secured to a carriage 64 which is slidable between the blocks 61 and 62 upon an oscillatable shaft 65 held in bearings 66 and 67 in the blocks 61 and 62 respectively.

The rotatable shaft 24, driven by the motor 12 through the pulleys 23 and 25 and belt 26, as previously referred to, extends forwardly through bearings in a bracket 68 secured to the sub-frame member 63 to a resilient coupling 69 which connects the shaft 24 to a further shaft 70 which is rotatable in a ball thrust bearing 71 in the block 62 and a plain bearing 72 in the block 61. The shaft 70 is provided with a square screw-threaded portion 73 over a substantial portion of its length between the blocks 61 and 62, and the carriage 64 is adapted to slide freely over the periphery of the threads.

A vertical passage 74 is formed in the carriage 64 directly above, and communicating with, the passage 75 through which the threaded portion 73 of the shaft 70 is free to slide, and in this passage 74 is slidably located a block 76, the lower end of which is arcuately recessed and provided with a threaded portion 77 which is adapted to mate with the threaded portion 73 when the block 76 is lowered, as will be made clear. Whilst the threaded portions 73 and 77 have been described as being square-threaded, the thread is preferably of the kind known as the "Acme" thread which, though substantially a square thread, has slightly tapered sides to the threads whereby a "lead" is provided to facilitate engagement of the portions 73 and 77 by transverse relative movement therebetween.

The shaft 65 has formed thereon a longitudinal projection 78 (see FIGURE 2) and this is adapted to engage within a chordal groove 79 formed in the side of the block 76, whereby oscillation of the shaft 65 will cause the block 76 to be raised or lowered in the carriage 64, and the threaded portions 73 and 77 brought into or out of engagement.

To enable this engagement to be effected from a position convenient to the operator, an arm 80 secured to the shaft 65 is pivoted to a link rod 81 which, in turn, is pivoted to an operating lever 82, itself pivoted, at its lower end, on a pin 83 between ears 84 secured to the base frame 8. A hand knob 85, or the like, is secured to the upper end of the lever 82.

The apparatus is operated as follows, assuming that it is to be brought into initial operation, or after a change in the tire size to be operated upon:

The cap nut 39 is loosened and the bolt 37 swung downwards to unlock the pivot 33, when the frame 32 and arms 40 may be swung horizontally towards the members 7, the fully retracted rollers 27 swinging outside the members 7 and also swinging outside the cylinder 10 upon reverse movement after the cylinder is positioned. Suitable cylinders 6 and 10 are attached to the members 7 and carriage 18, respectively, and the conduits 9 and 11 connected to the respective pressure source and exhauster. The frame 32 and arms 40 are then swung upwards and the pivot 33 is immobilised by re-engagement of the cap-nut 39. The foregoing operation, and swinging downwards of the frame 32 and arms 40, is not an essential operation, but simplifies the change-over between tire sizes.

A tread band 4 is then applied to the air bag 5 and transferred to the vacuum cylinder 10 as previously described.

A former 2 upon which the reinforcement 1 has been previously wound, preferably on apparatus as described in the previously mentioned Patent No. 2,906,314 is passed between the rollers 27 on to the shaft 3a, to which it is secured by the quick-release chuck device 13.

The operator then moves the vacuum cylinder 10 and the attached tread 4 over the former 2 by sliding the carriage 18 forwardly between the rollers 19, and when the centre of the tread 4 is disposed around the centre of the former 2, i.e., in line between the arms 40 and the former, he releases the vacuum in the cylinder 10 and the rubber tread 4 contracts around the periphery of the former. If annular side wall pieces are to be used, that for the inner wall may be passed on to the shaft 3a prior to the fitting of the former 2 thereto.

The operator then ensures that the threaded portions 73, 77 are disengaged and adjusts the orientation of the arms 40 so that the rollers 27 lie directly over, but clear of, the vertical centre line of the tread 4 as it lies on the former. The motor 12 is energised to rotate the shafts 3 and 24 through the respective V-belts 22 and 26. Rotation of the shaft 3 also rotates the shaft 3a and the former 2 and reinforcement 1 with the tread 4 preliminarily attached.

The valve 56 is now opened to admit a predetermined pressure of pressure-fluid to the cylinders 50 of the jacks, the piston rods 51 of which pivot the levers 45 and move the rollers 27 into firm rolling contact with the rotating tread 4, engaging the tread medially of the rotating former 2.

By moving one of the knurled handles 43 to his right or left the operator can now pivot the frame 32 and arms 40 about the vertical axis of the turn table 28 and so move the rollers across the surface of the former 2 from the centre of the tread towards its edge. As the roller 27 on the front of the former (as seen in FIGURE 1) is moved towards the right hand bead 15, the roller 27 behind the former will be moved towards the left hand bead. Thus it is not necessary for the rollers on each side to sweep across the entire periphery of the tread, but only that each should sweep from the centre line of the tread 4 to one or other of its edges, each roller then consolidating the periphery of one half of the tread.

Some amount of resistance to manual operation of the rollers 27 will be experienced, as the rollers are required to press firmly upon the tread to effect a satisfactory consolidation, and manual operation would be unsatisfactory over any long period by a single operator.

Means are accordingly provided to perform the sweeping operation mechanically.

The threaded shaft 70 is rotated by the shaft 24 through the coupling 69, and the threaded portion 73 is so disposed on the shaft 70 that when the rollers 27 are in line with the centre of the tread 4, the arm 57, tie rod 58, rods 59 and carriage 64 hold the threaded portion 77 of the block 76 adjacent the end of the threaded portion 73 nearest the bearing block 61. The threaded portion 73 is of such length on the shaft 70 that when the threaded portion 77 of the block 76 is just clear of the thread 73 the roller 27 of FIGURE 1 is on the extreme edge of the right hand bead 15 but clear of the former 2.

If, therefore, with the rollers 27 engaging the centre of the tread 4, the operating handle 82 is pushed in towards the apparatus the lever 80 will rotate the shaft 65, and the projection 78 in the groove 79 will press the block 76 down in the passage 74 in the block 64 until the threads 73 and 77 engage. The rotating threads 73 will thus draw the sliding block 64 along the shaft 65, with the projection 78 and groove 79 still in engagement.

Movement of the block 64 will draw the rods 59, cross bar 58a, link rod 58, and the arm 57 to pivot the frame 32 and arms 40 on the pivot 28 and cause the rollers 27 to sweep over their respective hemispheres with a steady, regular and continuous sweep until, when they reach the beads 15, the threads 73 and 77 will disengage. Normally, the pressure applied by the rollers 27 will make one such sweep sufficient to stitch the tread to the reinforcement and to remove all air pockets and wrinkles. Where this is insufficient the rollers 27 are re-positioned manually after the handle 82 has been moved away from the apparatus to lift the thread 77 clear of the thread 73, and the fluid-pressure in the jacks 50, 51 has been relieved to lift the rollers 27 clear of the former 2.

In this regard, it should be noted that the consolidating or stitching should always be performed from the centre of the tread outwardly to its edge and not, even in manual operation of the device, in the reverse direction.

Obviously, the threads 73 and 77 can be engaged anywhere along the thread 73, and, similarly, disengagment can be effected at any desired point by reverse operation of the handle 82. Thus, at this stage, the operator will move the handle 82 to disengage the threads 73, 77 when the rollers reach the edge of the thread and before they pass onto the side wall portions to which the rubber has not yet been applied.

Uniformity of rollers pressures over large batches of tires may be readily obtained by the incorporation in the jack cylinders 40 or in the conduit 55 of a pressure relief valve adapted to hold the cylinder pressures, and thus the rollers pressures within predetermined values.

When the tread 4 has been stitched, the jack pressure is released and the motor 12 de-energised to stop the rotation of the former. Side wall strips or annuli are applied as previously described and the motor is again energised. The rollers 27 are now oriented so that they lie above the inner edges of the side wall rubber and pressure is again applied to the jack cylinders 50 to engage the rollers 27 with the rotating side walls. The handle 82 is moved towards the apparatus and the threads 73 and 77 are again engaged to cause the rollers to sweep over the surface of the sidewalls from their inner edges outwardly of the beads 15.

This completes the stitching of the tire, and the motor 12 is de-energised, the rollers 27 raised by exhausting the cylinders 50, and the handle 82 moved outwardly to clear the threads 73, 77. The former 2 is removed from the shaft 3a, and the consolidated tire is now ready for shaping and moulding after removal from the former.

Having now described my invention—what I claimed is:

1. Apparatus for manufacturing tires which comprises a former having a spherical surface rotatable about its axis, a frame rotatable about an axis which passes through the center of the former at a right angle to the axis of rotation of said former, a pair of rollers mounted on said frame on diametrically opposite sides of the former and rotatable on axes parallel to a tangent to the surface of said former in position to consolidate the tread and side wall layers on a carcass reinforcement on said former, and means to force the rollers inwardly against said layers, and means to rotate the frame so that each roller traverses from the median plane of the tire to an edge thereof.

2. Apparatus according to claim 1 wherein said former rotates on a horizontal axis and said frame rotates on a vertical axis.

3. Apparatus according to claim 1 wherein said means to rotate said frame comprise a rotatable shaft having a screw thread formed on its periphery, a slidable carriage having a portion thereon adapted to be engaged with said screw thread, and extending from said frame, a link rod connecting said slidable carriage with said arm, and means operable to engage the threaded portion of said slidable carriage with the screw thread on said shaft.

4. Apparatus according to claim 3 comprising an oscillatable shaft and wherein said slidable carriage comprises a block having a horizontal passage therein and positioned to slide on the screw-threaded portion of said shaft, a second horizontal passage parallel to said first-named passage and positioned to slide over said oscillatable shaft, and a vertical passage communicating with said first-named passage, and wherein said means to engage the screw thread on said shaft comprises a block slidable in said vertical passage and having one end threaded to engage with the screw-thread on said rotatable shaft, said oscillatable shaft being operatively connected with said block whereby oscillation of said oscillatable shaft slides said block vertically in said slidable carriage to move said threaded end of said block into driving engagement with the screw-threaded portion of said shaft.

5. Apparatus according to claim 1 comprising means to expand an endless band of tread rubber to a diameter greater than that of said former, means to pass said expanded endless band around the greatest diameter of said former, and means to release said endless band into contact with said former around its greatest peripheral dimension.

References Cited in the file of this patent

UNITED STATES PATENTS

| Re. 19,895 | State | Mar. 24, 1936 |
|---|---|---|
| 1,321,493 | Thropp | Nov. 11, 1919 |
| 1,645,397 | Perrault | Oct. 11, 1927 |
| 2,352,055 | Witt | June 20, 1944 |
| 2,501,644 | Kraft et al. | Mar. 21, 1950 |
| 2,521,143 | Benson | Sept. 5, 1950 |
| 2,567,150 | Frazier | Sept. 4, 1951 |
| 2,604,420 | Barber | July 22, 1952 |
| 2,642,921 | Appleby | June 23, 1953 |
| 2,685,909 | Deist | Aug. 10, 1954 |
| 2,692,005 | De Cloud | Oct. 19, 1954 |
| 2,717,022 | Duerksen | Sept. 6, 1955 |
| 2,729,269 | Autraigue | Jan. 3, 1956 |
| 2,814,330 | Vanzo | Nov. 26, 1957 |